Jan. 17, 1928.  
L. F. MOODY  
HYDRAULIC TURBINE  
Filed June 25, 1920  
1,656,889  
4 Sheets-Sheet 1
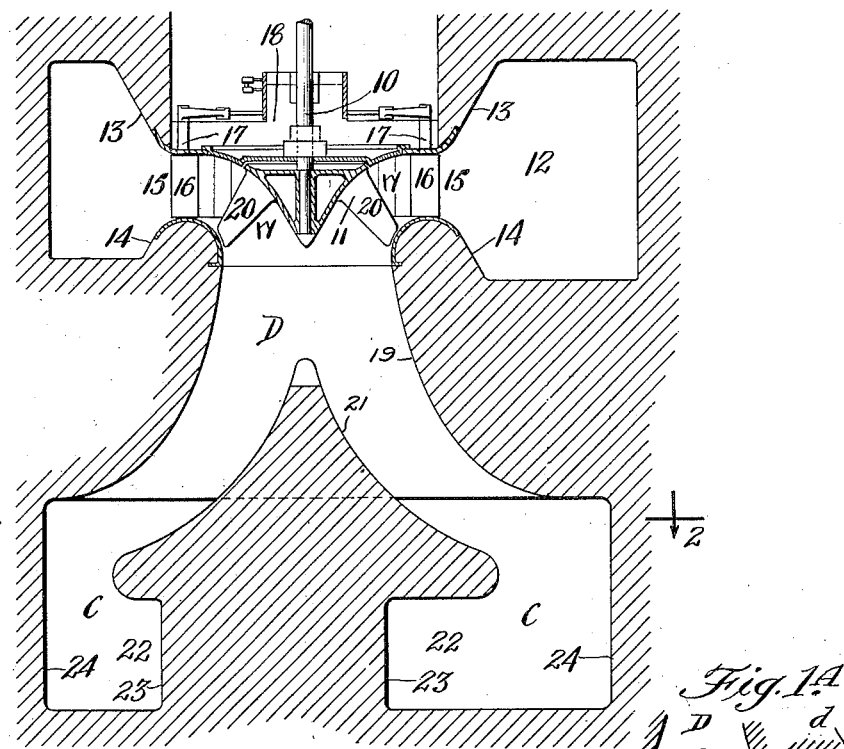
Fig.1.
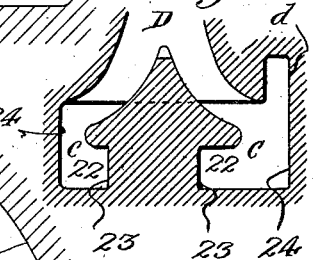
Fig.1ª
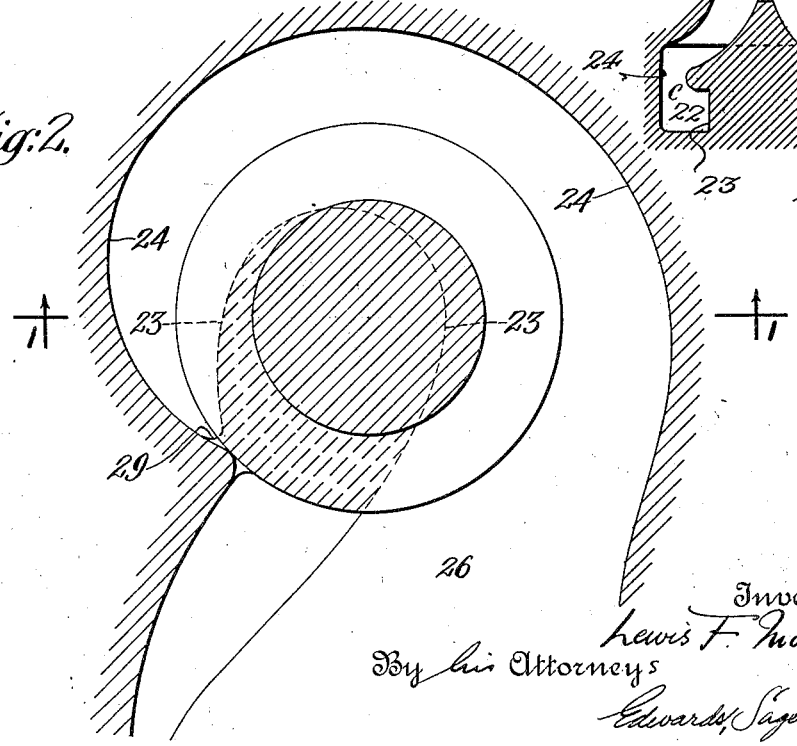
Fig.2.
Inventor  
Lewis F. Moody  
By his Attorneys  
Edwards, Sager & Bower

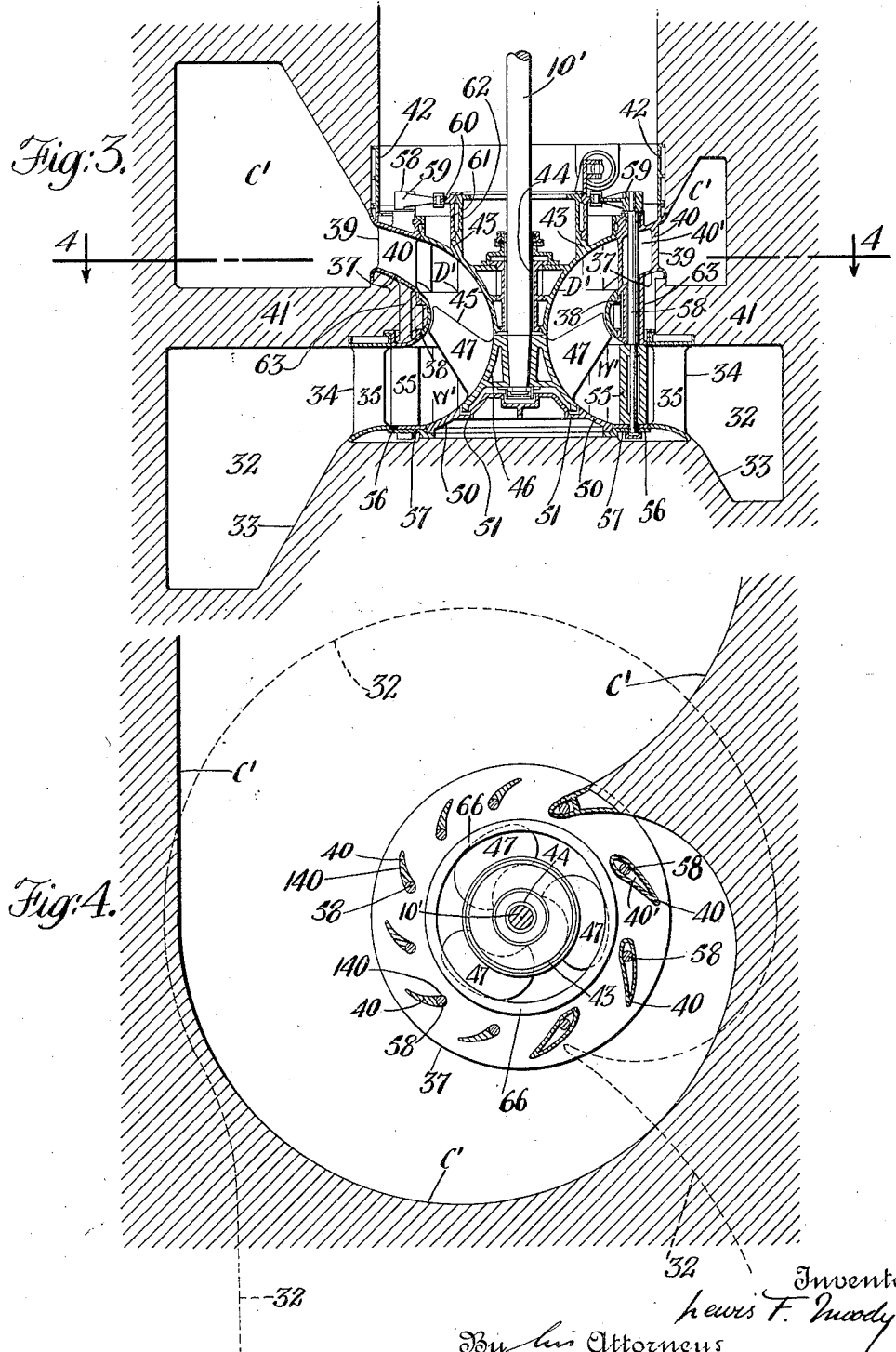

Jan. 17, 1928.
L. F. MOODY
1,656,889
HYDRAULIC TURBINE
Filed June 25, 1920 4 Sheets-Sheet 3
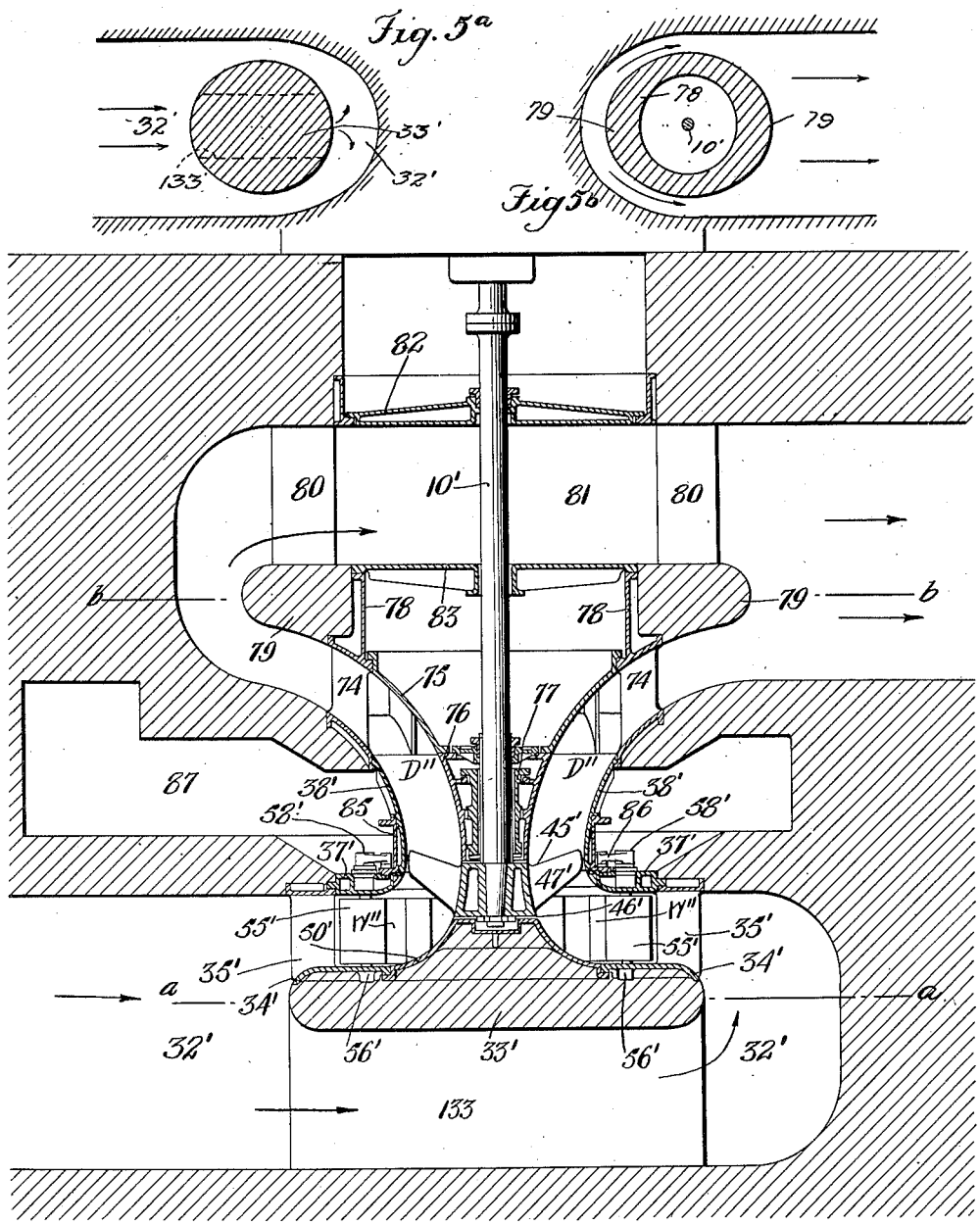

Jan. 17, 1928. 1,656,889

L. F. MOODY

HYDRAULIC TURBINE

Filed June 25, 1920     4 Sheets-Sheet 4

Inventor
Lewis F. Moody
By his Attorneys
Edwards, Sager & Bower

Patented Jan. 17, 1928.

1,656,889

UNITED STATES PATENT OFFICE.

LEWIS FERRY MOODY, OF PHILADELPHIA, PENNSYLVANIA.

HYDRAULIC TURBINE.

Application filed June 25, 1920. Serial No. 391,583.

This invention relates to hydraulic turbines, and particularly to turbines of high specific speed through which large quantities of water flow at high velocity head compared to the net head on the plant, and to turbines having wicket gate or movable guide vane means for regulating the flow. The object of the invention is to provide a turbine installation in which large quantities of water can be handled within a limited space, and within which the water can be set into motion at high velocity and again retarded to a low velocity at discharge with minimum loss of head, and may impart to the turbine runner a high velocity of rotation; and it is at the same time an object of the invention to provide such a turbine with an operating mechanism for controlling the power and speed, so arranged that the working parts are readily accessible outside of the water passages while the turbine is in operation.

Another object of the invention is to provide a turbine in which the intake and outflow passages and the control means are adapted to produce a whirling body of water within which the runner rotates at high speed, and to decelerate the velocity of whirl in a draft tube spreading outward away from the turbine axis on all sides, so as efficiently to regain the kinetic energy of the water leaving the runner.

Still another object of the invention is to provide a turbine in which the flow is upward with the outflow passage above the intake, and in which the movable guide vanes in the intake are operated from above.

The turbine to which the specific features of this invention are particularly adapted is one having a propeller type runner, that is, an unshrouded axial flow runner having a small number of vanes. In order to enable such a runner to operate at high velocity the draft tube of the turbine of this invention expands radially at its discharge end to a diameter considerably greater than that of the runner, so that the water may leave the runner with a considerable velocity of whirl, this whirl being efficiently decelerated and the water leaving the discharge end of the draft tube at low velocity.

Further objects of the invention particularly in the arrangement of the turbine units and passages in the power house will appear from the following description taken in connection with the accompanying drawings in which:

Fig. 1 is a vertical sectional view of a turbine installation taken on line 1, 1 of Fig. 2 showing one embodiment of the invention.

Fig. 1$^A$ is a vertical sectional view illustrating a modified form of draft tube.

Fig. 2 is a horizontal sectional view on line 2—2 of Fig. 1.

Fig. 3 is a vertical sectional view of a turbine installation illustrating a modification in which the flow is upward instead of downward as in Fig. 1.

Fig. 4 is a horizontal sectional view on line 4—4 of Fig. 3.

Fig. 5 is a vertical sectional view of a further modification.

Fig. 5$^a$ is a horizontal sectional view on line $a$—$a$ of Fig. 5.

Fig. 5$^b$ is a horizontal sectional view on line $b$—$b$ of Fig. 5.

Figure 7:
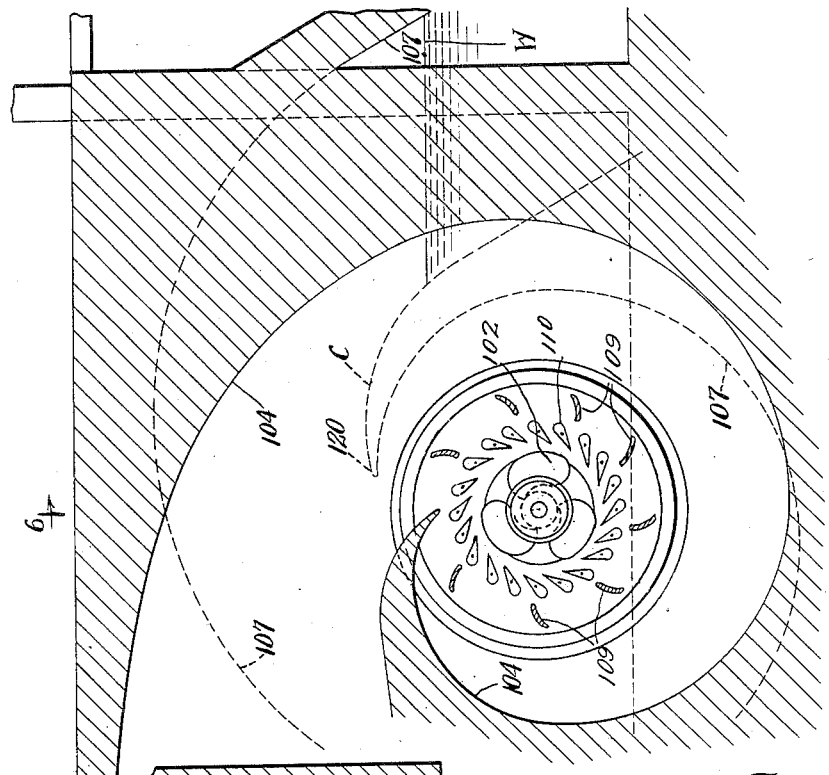
Figure 6:
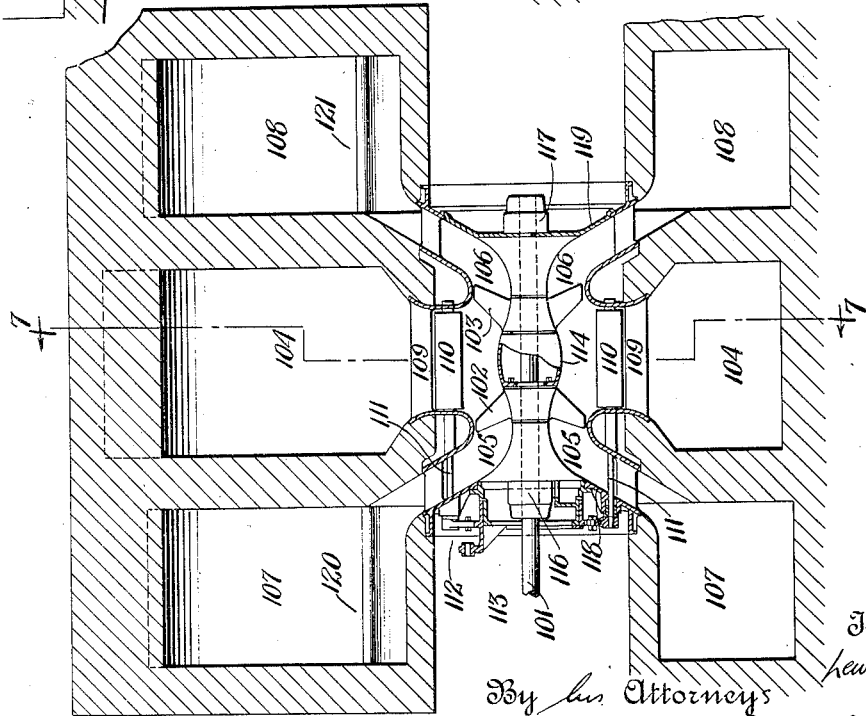

Fig. 6 is a vertical sectional view of a turbine having a horizontal instead of a vertical shaft as in the previous view, and Fig. 7 is a vertical sectional view on the line 7—7 of Fig. 6.

In the embodiment of the invention illustrated in Figs. 1 and 2 a turbine with a vertical shaft 10 has a runner 11 in the water passage W. The intake passage 12 leading to this water passage is a contracting volute having inner walls 13 and 14 substantially circular and converging to the entrance space 15 of the passage W. In this entrance space 15 are the adjustable guide vanes or wicket gates 16 controlled through their stems 17 by the operating means 18 around shaft 10.

The flow enters in through the intake passage 12 with a whirl and passes through adjustable guide vanes 16 in a radial direction and with a whirl and is turned downward toward the axial direction in the water passage W. In an intermediate position in this water passage W the blades 20 of the runner 11 are interposed, extending diagonally across the flow and being of the diagonal inward flow type, diagonal meaning at an angle between vertical and horizontal. The flow has radially inward components of velocity both at the tips of the runner blades and near the hub. This runner rotates at high speed under light torque and the discharge from it has a considerable velocity of whirl the energy of which would be largely lost in the ordinary straight draft tubes adapted to regain only the axial components of the discharge.

This invention is not restricted to any particular angles of the runner blades, but is applicable even when the blades are normal to the axis and the runner is of the axial flow type.

The draft tube D from water passage W has an outer surface of revolution 19 and an inner surface of revolution 21 and spreads or expands radially in the direction of flow so as to permit the whirling discharge to be decelerated on expanding spiral lines and at the same time the area of the draft tube across the meridian components of flow gradually increases. This provides for a natural gradual deceleration of both the axial and the whirl components of flow so as to regain the energy of both by reconverting it into effective pressure head. It should be understood that as the water recedes from the axis, since its moment of momentum will remain the same its velocity of whirl will vary inversely as the distance from the axis. The spreading draft tube D thus lowers the velocity of the discharge and delivers it to the outflow collector passage C of volute form expanding in the direction of outflow to continue the conversion of velocity into pressure head. The deceleration of the discharge requires constantly widening passages and to provide an outflow passage of large cross section without exceeding the allowable over-all dimensions, as determined for instance by the intake passage 12, the outflow volute C is extended to an undercut 22 below the central conoidal surfaces 21 of the draft tube D; the inner wall 23 of this undercut and the outer wall 24 of the collection chamber forming a volute outlet beginning at the point 29 and curving around and expanding into the outlet 26 (Fig. 2). By causing the collector passage C to lie partly beneath the central conical surface of the draft tube an economy of space is secured.

The draft tube just described conforms to the following principle:—It first diverts the water from the turbine axis in order to increase the radius of the paths of the whirling flow, in a space contained between two surfaces of revolution in which the whirling flow can freely proceed. At the point of greatest radius (the magnitude of this radius being limited by the space restrictions of the power house) the form of passage ceases to be a space contained between surfaces of revolution, and from this point onward the walls become spirals instead of circles about the axis, when viewed in planes perpendicular to the axis. If in undercutting the central conical wall, to gain the required conduit area, the walls of the passage were continued as surfaces of revolution approaching the axis once more, the law of "conservation of moment of momentum" above referred to would cause the velocity of whirl again to increase, this velocity varying inversely as the radius as already explained. By forming the conduit walls as spirals, however, from the point of greatest radius onward, the velocity is controlled at every point and made equal to the quantity flowing at each point divided by the transverse area of the channel, which can be so gradually increased that the velocity will gradually and continuously decrease up to the point of final discharge into the tail race.

If still greater cross sectional area is desired for the outflow passages the volute C may be extended upward as indicated at $d$ in Fig. 1$^A$ and still be kept within the permissible over-all dimensions. The turbine installation above described provides entrance and discharge water passages of large area with correspondingly low velocities and reduced friction losses and these passages at the same time cooperate with the water passage W to deliver the water to the runner and receive it therefrom at high velocity and with high velocity of whirl. Such a combination is particularly adapted for use with a high speed runner requiring high velocities of flow at the runner blades and extracting only a relatively small torque from the flow. The relatively large quantities of water utilized make it highly desirable to have both the conversion of pressure head into velocity head and the reconversion of velocity head into pressure head as efficient as possible. This is accomplished by the above described installation which at the same time provides for keeping the water passages within a compact space having relatively small over-all dimensions.

In the inverted turbine illustrated in Fig. 3 the intake passage 32 is below the outflow volute C' the flow being upward instead of downward as in Fig. 1. The intake passage 32 surrounds a central base 33 of frusto-conical form capped at the top by the speed ring 34 having stay vanes 35. Supported on the speed ring 34 is the upper ring 37 comprising a casing having a lower part 38 forming the outer wall of the water passage W' and draft tube D', and an upper part forming the upper stay vane ring 39 having its vanes 40 in the discharge. The speed ring 34 and upper ring 37 form a continuous columnar support sustaining at an intermediate point the partition 41 between the intake and outflow passages and carrying at the upper end the pit liner 42 and the pit bottom 43 surrounding the vertical shaft 10' and forming the inner wall of draft tube D'. The pit bottom 43 carries the bearing 44 for the shaft and just below this bearing is the runner 45 having a frusto-conical hub 46 and diagonal blades 47 extending across the water passage W'. It will be noted that the blades of the runner are preferably of the propeller type as indicated in Fig. 4. A plate 50 at the top of the conical base 33 completes the inner wall of the passage W' and is channeled at 51 to receive a flange of the runner hub 46.

Adjacent the fixed vanes 35 of speed ring 34 are the adjustable guide vanes 55 movably mounted on annular plate 56 inset in the inward extension 57 of the speed ring 34. The stems 58 of the guide vanes 55 extend downward into recesses in the plate 56 and extension 57 and extend upward through the ring 37 and through the draft tube D' and at their upper ends carry levers 59 connected by links 60 to the operating ring 61 having a bearing on the cylindrical extension 62 of the pit bottom 43. These stems 58 are housed in sleeves 63 in the lower casing portion 38 of ring 37, and in the draft tube D' they either pass through and are housed in hollow stay vanes as indicated at 40' (Figs. 3 and 4) or are seated in recesses in the ends of the stay vanes 40 as shown at 140 (Fig. 4) and partially exposed to the flow.

Another modified form of inverted turbine is shown in Fig. 5 particularly adapted for installations where it is desirable to limit the lateral over-all dimensions for instance where a number of turbine units are to be placed close together in a row. In such a situation it is often important to install as many units as possible within a given length of power house and the depth to which the substructure extends is relatively unimportant. Under these conditions it may be advantageous to lead in the flow by intake passage 32' surrounding the turbine inflow vane rings 35' and 55' which are in the upper portion of passage 32'. This passage may be narrowed at the sides toward adjacent units so as to have a somewhat oval shape (see Fig. 5ª) concentric with the turbine runner shaft 10' and a series of turbine units will have a series of such oval passages with their short axes arranged end to end giving a very compact construction. The lower portion of passage 32' surrounds a central concrete base or slab 33' consisting of a horizontal plate supported by piers so as to provide the passage 133 for the flow to the extreme end of the intake passage 32'. The base 33' may be somewhat oval in form as shown in Fig. 5ª.

Supported on this central base 33' is the speed ring 34' having fixed stay vanes 35' supporting the annular casting 37' carrying the upper bearings for the stems 58' of adjustable guide vanes 55'. The lower ends of these stems are swiveled in bearings 56' in the speed ring 34'. The casting 37' forms a portion of the outer surface of water passage W'' and extending upward therefrom is the ring 38' forming the outer surface of the draft tube D'' and extending to engagement with the discharge stay vane ring 74 seated in the foundation. At the inside the stay vane ring 74 supports the castings 75 and 76 forming the inner surface of the draft tube D'' and carrying the bearing 77 for the runner shaft. The upper portion of the stay vane ring 74 is extended at 78 and supports the concrete ring 79 of preferably oval form (see Fig. 5ᵇ) corresponding to the oval of the base 33'. Stays or piers 80 connect this ring in spaced relation to the foundation above and leave a passage 81 for the discharge around the runner shaft and between the cover plates 82 and 83. The ring 79 and cover 83 form a base or slab member similar to the base 33'.

The ring 38' has journaled thereon the operating ring 85 moved by fluid pressure means controlled through piping by a governor on the power house floor above. The ring 85 is linked to arms 86 of the stems 58' of the adjustable intake guide vanes 55' and a chamber 87 is provided in the foundation giving access to these parts for inspection and repair. The turbine runner and operating parts are vertically removable to the floor of the power house above, the cover plates 82, 83, castings 75, 76 and 38' being removable in the same manner.

The runner 45' has its blades 47' extending diagonally across the water passage W'' with the outer tips of the blades in a region of substantially axial flow and with the flow at the inner portions of the blades nearly axial in direction and with a small inward component as the flow passes through this inner portion of the runner.

By carrying the intake 32' under the central base 33' and the outflow passage 81 over the draft tube the usual lateral spreading of these intake and discharge passages is minimized so that for the same area across the flow the turbine units may be much more closely spaced in the power house. At the same time easy accessibility to the operating parts is attained and all of the movable parts are removable and replaceable.

This Fig. 5 form of turbine thus provides an oval shaped slab element adjacent to the turbine head cover, this slab element being completely surrounded by the flow and leaving the water to follow its own path around the slab element to the guide vanes. There is therefore a continuous supply of water around the turbine periphery and the flow entering directly from the intake is in contact with the flow which has been carried inward and turned through 180° to enter the guide vanes, portions of the flow passing laterally along the sides of the oval formation. It is obvious that while the turbine of Fig. 5 is shown in inverted position it may be used in any desired position such as horizontal or upright.

In the modification shown in Figs. 6 and 7 the turbine shaft 101 is horizontal instead of vertical as in the previous views and is provided with a pair of runners 102 and 103 receiving the flow from a single intake passage 104 and discharging it in opposite directions through draft tubes 105, 106 into discharge passages 107, 108. The stay vanes of the speed ring 109 direct the flow from the intake volute 104 to the adjustable guide vanes 110 controlled by stems 111 extending through draft tube 105 to control means 112 in the end of a recess 113 in the power house wall. A central hub 114 surrounds shaft 101 between the hubs of runners 102 and 103 and at each side of the runners the shaft is journaled in bearings 116, 117 in conical projections 118, 119 extending inward from the foundation walls and forming the inner surfaces of draft tubes 105, 106. If runners of axial flow type are used, the enlarged central hub 114 could be reduced in diameter and formed as a straight sleeve between the runners, or it could be omitted altogether. The intake volute 104 wraps around the runners at the middle and the discharge passages 107, 108 at each side wrap around circular projections from the foundation walls giving a very compact arrangement. The discharge passages 107, 108 are volute in form as indicated in dotted lines in Fig. 7 and may have their baffles 120, 121 at the top forming crests C between the draft tubes and the tail water W. The discharge passages are, therefore, siphonic in form and with the intake passages closed the turbine passages may be pumped empty without providing tail gates if the turbines are so placed that the crests C are higher than the maximum tail-water elevation.

I claim:

1. In a hydraulic turbine the combination with an intake, of a discharge vertically above said intake, a conduit continuously curving in one direction and leading from said intake to said discharge, and a turbine runner in said conduit.

2. In a hydraulic turbine the combination with an intake adapted to direct the water radially and impart a whirl to the flow, of a discharge above said intake receiving the water radially and with a whirl, a conduit continuously curving in the same direction and leading from said intake to said discharge, a turbine runner in said conduit and spaced from said intake so as to leave a curving transition space between said intake and said runner.

3. In a hydraulic turbine a draft tube having an outer flaring wall and a central core member having conical side surfaces and a base surface, said core member being formed with a water passage along its base surface, and a stay vane ring in the draft tube passage between said core member and said outer surface.

4. In a hydraulic turbine structure the combination with an intake passage, of a speed ring therein, conduit walls supported by said speed ring, an upper discharge passage, stay vanes therein supported by said conduit walls, and a cover casting supported by said stay vanes.

5. In a hydraulic turbine structure the combination with an intake passage, of a speed ring and adjustable vanes therein, conduit walls supported by said speed ring, an upper discharge passage, stay vanes therein supported by said conduit walls, a cover casting supported by said stay vanes and means extending upward from said adjustable vanes for controlling their adjustment.

6. In a hydraulic turbine the combination with an intake of a discharge above said intake, adjustable guide vanes in said intake, upwardly extending stems from said guide vanes, and means connected to said stems for adjusting said vanes.

7. In a hydraulic turbine the combination with a flow passage comprising an intake passage and a draft tube of the conical diverging type, of movable guide vanes in said intake, an operating chamber surrounding said flow passage and intermediate between the ends thereof, and means in said chamber for operating said movable guide vanes.

8. In a hydraulic turbine the combination with a radially directed entrance passage for the flow to the runner, of a slab member having one of its faces forming a wall of said entrance passage and an intake chamber surrounding said entrance passage and adapted to pass the flow along the opposite face of said slab member.

9. In a hydraulic turbine the combination with a radially directed entrance passage having guide vanes directing the flow to the runner, of a slab member having one of its faces forming a wall of said entrance passage and an intake chamber surrounding said entrance passage and adapted to pass the flow along the opposite face of said slab member.

10. In a hydraulic turbine the combination with a radially directed entrance passage having adjustable guide vanes directing the flow to the runner, of a slab member having one of its faces forming a wall of said entrance passage and an intake chamber surrounding said entrance passage and adapted to pass the flow along the opposite face of said slab member.

11. In a hydraulic turbine the combination with a radially directed entrance passage for the flow to the runner, of a flat slab member of generally oval form having one of its faces forming a wall of said entrance passage and an intake chamber surrounding said entrance passage and adapted to pass the flow along the opposite face of said slab member.

12. In a hydraulic turbine discharge guiding means comprising a central conical member forming the inner surface of a draft tube and having a base portion with a flat surface, means forming a discharge passage receiving the outflow from said draft tube and guiding it across said base surface of said central conical member.

13. In a hydraulic turbine discharge guiding means comprising a central conical member forming the inner surface of a draft tube and having a base portion of generally oval form with a flat surface, means forming a discharge passage receiving the outflow from said draft tube and guiding it across said base surface of said central conical member.

14. In a hydraulic turbine discharge guiding means comprising an outer surface of revolution and a central conical member having its surface flaring outwardly in the direction of flow and having a base surface and an outlet chamber receiving the flow from said surfaces and comprising a passage along said base surface of said central member.

15. In a hydraulic turbine the combination with a flow passage comprising an intake passage and a discharge passage, of adjustable guide vanes in said intake passage, and control means for said guide vanes in the space surrounding the flow passage on the discharge side of said intake passage.

16. In a hydraulic turbine the combination with an intake passage and a discharge passage, of adjustable guide vanes in said intake passage, control means for said guide vanes on the discharge side of said turbine and a control chamber in the foundation between said intake passage and said discharge passage.

17. In a hydraulic turbine the combination with a contracting inflow passage and an expanding outflow passage, of oppositely directed central conical members in said passages having surfaces forming the inner surfaces of the water passage, and a runner between said inflow passage and said outflow passage, the base of one of said conical members being formed with a water passage through it for the flow.

18. In a hydraulic turbine the combination with a contracting inflow passage and an expanding outflow passage, of oppositely directed central conical members in said passages having surfaces forming the inner surfaces of the water passage, and a runner between said inflow passage and said outflow passage, the base of one of said conical members being formed with a water passage through it for the flow, and stay vanes supporting one of said conical members from the other.

19. In a hydraulic turbine the combination with an intake, of a discharge vertically above said intake, a conduit continuously curving in one direction between inner and outer concentric surfaces of revolution and leading from said intake to said discharge, and a turbine runner in said conduit.

20. In a turbine the combination with a passage turning the flow from radial toward an axial direction, of a runner in said passage, adjustable guide vanes in the radial flow portion in said passage, and operating means for said guide vanes surrounding the axial flow portion of said passage.

21. In a hydraulic turbine the combination with a runner, of a core member in the draft tube coaxial with said runner, and means for detachably supporting said core member so that said core member may be moved to permit removal of the runner.

22. In a hydraulic turbine the combination with a radially directed entrance passage for the flow to the runner of a slab member having one of its faces forming a wall of said entrance passage and an intake chamber surrounding said entrance passage and adapted to pass the flow to said entrance passage without side guiding surfaces so that the flow freely enters the entrance passage around its entire periphery, another portion of said intake chamber being adapted to pass the flow along the opposite face of said slab member.

23. In a hydraulic turbine the combination with an entrance passage for the flow to the runner of a slab member forming one surface of said entrance passage, guide vanes connected to said slab member, an intake chamber freely surrounding said entrance passage at all points, and a flow passage along the surface of said slab member on the side of said slab member opposite said entrance passage.

24. In a hydraulic turbine the combination with an entrance passage for the flow to the runner of a slab member forming one surface of said entrance passage, guide vanes connected to said slab member, an intake chamber freely surrounding said entrance passage at all points, a flow passage along the surface of said slab member on the side of said slab member opposite said entrance passage and pier members supporting said slab member from a wall of said intake chamber.

25. In a hydraulic turbine the combination with an intake, of a discharge vertically above said intake, a conduit continuously curving in one direction and leading from said intake to said discharge, and a high specific speed propeller type turbine runner disposed in an intermediate portion of said conduit.

26. In a hydraulic turbine the combination with an intake, of a discharge vertically above said intake, a conduit continuously curving in one direction between inner and outer concentric surfaces of revolution and leading from said intake to said discharge, guide vanes in said intake adapted to impart whirl to the fluid flowing through said intake, and a high specific speed propeller type turbine runner in an intermediate part of said conduit and spaced from said vanes to form a transition space.

LEWIS FERRY MOODY.